United States Patent
Guyan et al.

(10) Patent No.: US 11,956,334 B2
(45) Date of Patent: Apr. 9, 2024

(54) VISUALIZING CLUSTER NODE STATUSES

(71) Applicant: HEWLETT PACKARD ENTERPRISE DEVELOPMENT LP, Houston, TX (US)

(72) Inventors: Peter Guyan, Bracknel (GB); Lee M. Morecroft, Bracknel (GB); Andrew J. Barrington, Lytham (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 382 days.

(21) Appl. No.: 17/201,069

(22) Filed: Mar. 15, 2021

(65) Prior Publication Data
US 2022/0294865 A1 Sep. 15, 2022

(51) Int. Cl.
| | |
|---|---|
| H04L 67/75 | (2022.01) |
| G06T 11/00 | (2006.01) |
| G06T 11/60 | (2006.01) |
| H04L 67/10 | (2022.01) |
| H04L 67/12 | (2022.01) |

(52) U.S. Cl.
CPC .......... H04L 67/75 (2022.05); G06T 11/001 (2013.01); G06T 11/60 (2013.01); H04L 67/10 (2013.01); H04L 67/12 (2013.01); G06T 2200/24 (2013.01)

(58) Field of Classification Search
CPC ......... H04L 67/75; H04L 67/10; H04L 67/12; G06T 11/001; G06T 11/60; G06T 11/206; G06T 2200/24
See application file for complete search history.

(56) References Cited

U.S. PATENT DOCUMENTS

| | | | |
|---|---|---|---|
| 8,352,584 B2 | 1/2013 | Franklin | |
| 9,047,181 B2 | 6/2015 | Noel et al. | |
| 2006/0190768 A1* | 8/2006 | Kawase | G06F 11/328 714/31 |
| 2009/0231350 A1* | 9/2009 | Hourselt | G06T 11/206 345/530 |
| 2012/0110150 A1* | 5/2012 | Kosuru | H04L 41/0863 709/221 |
| 2021/0311509 A1* | 10/2021 | Kishore | H04L 43/045 |

OTHER PUBLICATIONS

Command man pages > ONTAP 9.3 commands > system commands > system node commands > system node power commands; "System node power Show"; https://docs.netapp.con/ontap-9/index..jsp?topic=%2Fcom.netapp.doc.dot-cm-cmpr-930%2Fsystem_node_power_show.html ; downloaded on Dec. 22, 2020, 23 pages.
IBM; "Multi-cluster ASCII Display Mode"; www.ibm.com/support/knowledgecenter/SSPHQG_7.2/admin/ha_admin_multi_clust_ascii.html; downloaded on Dec. 22, 2020; 4 pages.
JIRA; "Jira cluster monitoring / Administering Jira applications Data Center and Server 8.14/ Atlassian Documentation"; https://confluence.atlassian.com/adminjiraserver/jira-cluster-monitoring-983794905.html; downloaded on Dec. 22, 2020; 9 pages.

\* cited by examiner

*Primary Examiner* — Said Broome
*Assistant Examiner* — Andrew Shin
(74) *Attorney, Agent, or Firm* — Trop, Pruner & Hu, P.C.

(57) ABSTRACT

A process includes receiving data representing states of a plurality of nodes of a cluster. The process includes, based on the states, generating data to display, in a text mode on a display device, a plurality of text character status indicators. First text character status indicators are arranged in a first grid that correspond to a physical layout of first nodes in a first computer system rack, and each first text character status indicator represents a status of a corresponding first node.

22 Claims, 10 Drawing Sheets

```
[root@hawk-master ~]# power-map
Setting Cluster Array: |Done.
Getting power status: Done.
Populating Cluster Data: Done.
```

```
     Rack33   Rack34   Rack35   Rack36   Rack37   Rack38   Rack39   Rack40
   12345678 12345678 12345678 12345678 12345678 12345678 12345678 12345678
44 11111111 00000000 00000000 00000000 00000000 00000000 00000000 00000000
43 11111111 00000000 0000/000 00000000 00000000 00000000 00000000 00000000
42 11111111 00000000 00000000 00000000 00000000 000_0000 00000000 00000000
41 11111111 00000000 00000000 00000000 00000000 00000000 00000000 00000000
34 11111111 00000000 0000/000 00000000 11111111 00000000 00000000 00000000
33 11111111 00000000 00000000 00000000 11111111 00000000 00000000 00000000
32 11111111 00000000 00000000 00000000 11111111 00000000 00000000 00000000
31 11111111 00000000 00000000 00000000 11111111 00000000 00000000 00000000
24 11111111 00000000 00000000 00000000 00000000 000000F0 00_00000 00000000
23 11111111 00000000 00000000 00000000 00000000 0o_00F0 00000000 00000000
22 1111_111 00000000 00000000 00000000 00000000 1100/00F0 00000000 00000000
21 1111_111 00000000 00000000 00000000 00000000 000000F0 00000000 00000000
14 11111111 00000000 00000000 00000000 00000000 00000000 00000000 00000000
13 11111111 00000000 00000000 00000000 00000000 00000000 00000000 00000000
12 11111111 00000000 00000000 00000000 00000000 00000000 00000000 00000000
11 o1111111 00000000 00000000 00000000 00000000 00000000 00000000 00000000
```

```
     Rack01 Rack02 Rack03 Rack04 Rack05 Rack06 Rack07 Rack08 Rack09 Rack10 Rack11 Rack12 Rack13 Rack14 Rack15 Rack16
   12345678 ...
44 11111111 11111111 ...
```

```
Summary
=====
Number of nodes booted:              1  4249
Number of nodes on but not booted:   o   854
Number of nodes powered off:         /     4
Number of nodes offline:             X     0
Number of nodes in reset state:      R     0
Number BMCs not pingable:            F     4
Total number of possible nodes:         5120
Total number of nodes processed:        5112
Total number of missing nodes:         _   8
```

FIG. 6

VISUALIZING CLUSTER NODE STATUSES

BACKGROUND

A cluster is a group of interconnected computers, or nodes, which combine their individual processing powers to function as a single, high performance machine. A cluster may be used for a number of different purposes, such as load balancing, high availability (HA) server applications and parallel processing.

BRIEF DESCRIPTION OF THE DRAWINGS

FIGS. 4, 5, 6 and 7 are text character-based status visuals that show power on statuses of nodes of a cluster according to example implementations.

DETAILED DESCRIPTION

Figure 1:
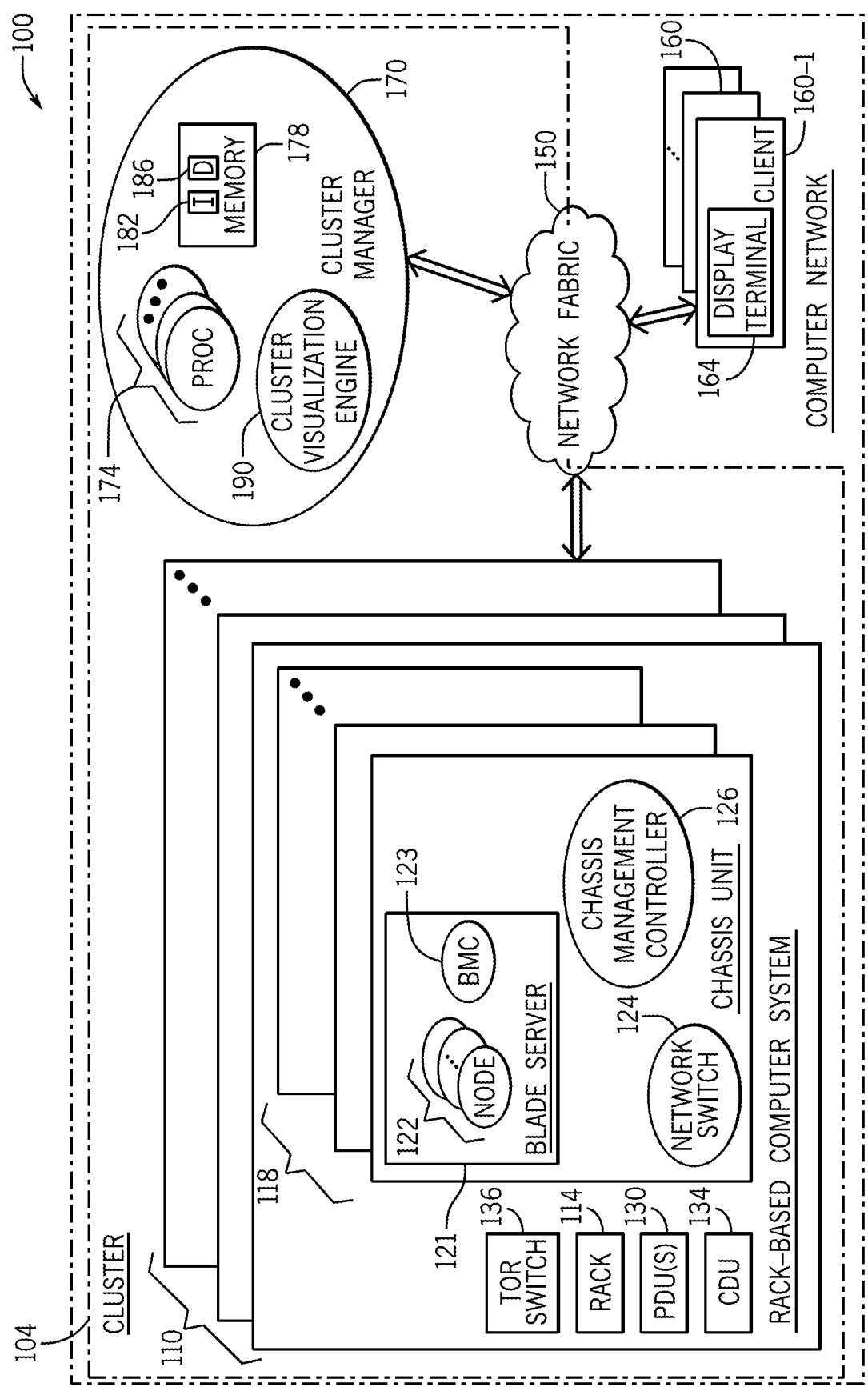
FIG. 1 is a schematic diagram of a computer network that includes a cluster having a cluster visualization engine according to an example implementation.

A cluster (e.g., an exascale high performance computing (HPC) cluster) may have a suite of management software, called a "cluster manager," for purposes of providing management-related services for the cluster, such as set up and provisioning services, hardware monitoring services, system alert notification services, and so forth. For purposes of accessing and using these services, the cluster manager may provide a user interface, such as a command line interface and/or a graphical user interface (GUI).

For a cluster having a relatively large number of nodes (e.g., an exascale cluster having hundreds, if not thousands or tens of thousands of nodes), it may be challenging to identify and troubleshoot problems with the cluster using a command line-based interface or a GUI-based user interface. For example, for purposes of node monitoring and troubleshooting, a user (e.g., a cluster administrator, a field engineer, and so forth) of the cluster may, through the cluster manager's command line interface, enter a command to list the power on statuses of all of the cluster's compute nodes. For a cluster having a relatively large number of nodes, the execution of such a command may return a list of thousands of nodes and their associated power on statuses. Although the user may use sorting and searching commands (e.g., grep and sort commands) through the command line interface to organize the reported information, the organized information may be too voluminous for the human mind to efficiently process the information and recognize problematic trends with the cluster.

A user may use a GUI-based user interface of a cluster manager to summarize node statuses according to certain groupings (e.g., the user may use the GUI to group the node statuses according to affiliated chassis units or racks). However, for a cluster with a relatively large number of nodes, spotting problematic trends of the cluster using organizational features of the GUI may still be a daunting task, as the human mind may be inadequately equipped to efficiently process the GUI's grouped information to spot problematic trends with the cluster. Moreover, a given cluster may have multiple users logging in remotely from many different geographical locations for purposes of troubleshooting problems with the cluster. For such concurrent troubleshooting from different geographical locations, a significant amount of processing time and data bandwidth may be consumed to support the visualization of thousands of node statuses on the GUIs, which may cause GUI interaction to be rather sluggish.

In accordance with example implementations that are described herein, a cluster visualization engine provides data that represents a text character-based status screenshot image, or visual, which shows, via displayed text characters, the individual statuses of corresponding nodes of the cluster. Stated differently, the text characters are individual status indicators for corresponding nodes of the cluster. Here, a "visual" refers to content that is displayed in a single view, or pane (e.g., a Linux operating system pane), on a display device. In other words, a user may view the visual at one time on the display device, without scrolling or other interaction to pan over the statuses.

In accordance with example implementations, the text character-based status visual contains text characters; each of the text characters corresponds to a status for one of the nodes of a cluster; and the text characters are spatially organized in the visual to coincide with the physical layout of the cluster. Moreover, in accordance with example implementations, text characters for all of the nodes of the cluster may appear in a single pane, which allows a human viewer to see all of the node statuses at the same time. Consequently, due to the concise nature of the text character-based status visual and its spatial relationship to the actual, physical layout of the cluster, the node statuses are presented in a format that is conducive for the human mind to efficiently process and quickly spot problematic trends with the cluster. Additionally, because, in accordance with example implementations, the statuses of the nodes have a one-to-one correspondence to text characters that may be represented by character codes in a text file, the statuses may be displayed on local text terminals by viewing the text file; the transmission of the text file consumes relatively little network bandwidth; and the text character-based statuses may be shown via single text character-based, symbolic characters that are independent of language, thereby overcoming any potential language barriers. Accordingly, the text character-based status visual may be viewed concurrently at a number of disparate geographical locations having a variety of different display devices.

For an exascale cluster, which may have ten thousand or more nodes that may be located in multiple racks and multiple data centers, the ability to quickly identify patterns may be paramount to spotting and addressing anomalies with the cluster. Moreover, the single pane viewing of a relatively large number of node statuses presents a concise status snapshot for the human mind to process. For example, as will become apparent from the following description and examples, an 8K computer monitor may display text characters that show the statuses of corresponding nodes of an exascale cluster of up to 64,000 nodes. Moreover, in accordance with example implementations, the node statuses for an exascale cluster may be partitioned into multiple terminals showing different groups of nodes of the cluster in operation (e.g., groups partitioned according to the data center so that nodes belonging to a particular data center appear on the same terminal).

Referring to FIG. 1, as a more specific example, in accordance with some implementations, a computer network 100 includes a cluster 104; and the cluster 104 includes various nodes 122, such as compute nodes; one or multiple administrative nodes; and other nodes, such as data transfer nodes, storage nodes, and so forth. In this context, a "node" refers to an entity that includes one or multiple processing cores (e.g., central processing unit (CPU) cores, graphics processing unit (GPU) cores, field programmable gate arrays (FPGAs), or other node accelerator cores) and corresponds to a single operating system (OS) instance. In accordance with example implementations, a node may be considered a server. A node may be formed from all or part of an actual, physical machine; and the node may include and/or correspond to one or multiple virtual components or virtual environments of a physical machine.

As further described herein, in accordance with example implementations, a node may be formed from one or multiple processing cores of a server tray (called a "server blade" herein). In accordance with further implementations, a node may be formed from one or multiple processing cores that are part of a hardware platform other than a server blade, such as a non-rack mounted platform, a rack-mounted server, and so forth.

The nodes 122 of the cluster 104, in accordance with example implementations, communicate via network fabric 150. In general, the network fabric 150 may be associated with one or multiple types of private and/or public communication networks, such as (as examples) Fibre Channel networks, iSCSI networks, ATA over Ethernet (AoE) networks, HyperSCSI networks, Gen-Z fabrics, dedicated management networks, local area networks (LANs), wide area networks (WANs), global networks (e.g., the Internet), wireless networks, or any combination thereof.

In accordance with example implementations, one or multiple administrative nodes 122 of the cluster 104 provide a cluster manager 170. The cluster manager 170 may be accessed by one or multiple clients 160 of the cluster 104 via the network fabric 150 for purposes of managing the cluster 104 (e.g., accessing services for such purposes as setting up compute nodes, provisioning, monitoring node statuses, logging into node consoles, and so forth). In general, a "client" refers to a processor-based machine, such as a desktop computer system, a laptop, a tablet computer, a smartphone, and so forth. As a specific example, FIG. 1 depicts a client 160-1 that includes a display terminal 164. The display terminal 164 may have a number of different forms, depending on the particular implementation, such as a standalone monitor, a text terminal, a graphics-capable display unit, a built-in display panel, and so forth.

Regardless of its particular form, in accordance with example implementations, the display terminal 164 is constructed to provide a text mode visual output (e.g., a text character-based status visual depicting node statuses in a pane displayed on the display terminal 164). The text mode visual output may be provided, for example, by the user entering a command (e.g., a command specifically requesting a text mode visual output of power on node statuses) in the command line interface. In this context, a "command line interface" refers to a user interface that is provided by a computer for purposes of receiving in the form of text (e.g., text entered by corresponding keys on a keyboard) that describes one or multiple commands to be executed by the computer in response thereto. As an example, the command line interface may provide a prompt (e.g., one or multiple predefined text characters) that indicates the readiness of the computer to receive a textual input; and near the displayed prompt (e.g., to the right of the prompt), a user may enter text that represents one or multiple commands, as well as one, multiple or zero command line parameters for the command(s).

In this context, a "text character-based status visual" refers to displayed content that corresponds to a text mode in which text characters are displayed in character locations (i.e., displayed in character boxes, or cells) that are organized in rows and columns. In this context, a "text mode" refers to a computer display mode in which the displayed content is represented on a display screen (e.g., a computer monitor) by symbolic characters (e.g., alphanumerical characters, symbols, and so forth) appearing in corresponding text character cell locations, rather than by individual pixels. The text mode is to be contrasted to a graphics mode in which the displayed content corresponds to pixels, instead of corresponding to text characters. The Linux console mode is an example of a text mode. As an example, in a text mode, the background of the display content may be black (as an example), and text characters may be displayed in the foreground in a non-black color (as an example). The text characters may have a single color (i.e., for monochrome display content), or the colors of the text characters may vary to represent additional status information for the nodes, as further described herein.

The text characters may, in accordance with example implementations, be represented by corresponding character codes. As examples, the text character codes may be American Standard for Information Interchange (ASCII)-based codes, ASCII variant-based codes, Unicode codes, or other text character codes, depending on the particular implementation. The text character-based status visual may be the result of displaying a content that is represented by character code data that is contained in a text file. In this regard, the text file may contain data representing lines of character codes, where each line of character code corresponds to a horizontal row of character cells of the text mode display.

In accordance with example implementations, a user, via a client 160, may submit a request (e.g., a request submitted due to the entry of a command in a command line interface) for the cluster manager 170 to provide data (e.g., a text file) that represents statuses of the nodes 122. In accordance with example implementations, the data represents text characters for a single, text character-based status visual to be displayed on a display terminal 164 of the client 160; and the text characters of the visual are status indicators that represent individual statuses (e.g., power on statuses, as further described herein) of all of the nodes 122 of the cluster 104. Moreover, in accordance with example implementations, as further described herein, the text characters are spatially arranged in the visual to coincide with the physical, spatial layout of the corresponding nodes 122. Because, in accordance with example implementations, all of the node statuses may be concurrently displayed in the same display pane, the user may readily identify potential problematic trends with the cluster 104.

For example implementations that are described herein, a given text character of the text character-based status visual is a status indicator that represents a "power on status" for a corresponding node 122. In this context, a "power on status" represents a state of the node 122 relating to its boot. As examples, the state may represent whether the node 122 is powered on (but not fully booted), whether the node 122 is offline for purposes of main channel network communication, whether the node 122 is offline for purposes of sideband management channel communication, whether the node 122 has fully booted, and so forth, as further described herein.

In accordance with example implementations, for purposes of generating the data representing the text character-based status visual, the cluster manager 170 includes an entity that is referred to as a "cluster visualization engine 190" herein. In accordance with some implementations, the cluster visualization engine 190 may be an entity that is formed by one or multiple processors 174 (e.g., central processing unit (CPU) processing cores) executing machine executable instructions 182. As depicted in FIG. 1, instructions 182 may be stored in a memory 178. In accordance with some implementations, the processor(s) 174 and memory 178 may be components of one or multiple nodes 122 and/or other processor-based hardware platform(s).

The memory 178, in general, is a non-transitory storage medium that may be formed from semiconductor storage devices, memristor-based storage devices, magnetic storage devices, phase change memory devices, a combination of one or more of these storage technologies, and so forth. Moreover, the memory 178 may represent a combination of different storage types, such as a volatile memory and/or a non-volatile memory. In addition to the instructions 182, the memory 178 may store data 186, such as data representing preliminary, intermediate and/or final values associated with tasks that are performed by the cluster visualization engine 190, as described herein.

In accordance with further example implementations, the cluster visualization engine 190 may be formed by a combination of hardware that does not execute machine-executable instructions (e.g., a Field Programmable Gate Array (FPGA), an Application Specific Integrated Circuit (ASIC), and so forth) and hardware that executes machine-executable instructions. Moreover, in accordance with further implementations, the cluster visualization engine 190 may be formed solely from hardware that does not execute machine-executable instructions.

In accordance with further example implementations, the cluster visualization engine 190 may be a component that is separate from the cluster manager 170.

Regardless of its particular form, the cluster visualization engine 190, in accordance with example implementations, generates the data representing the text character-based status visual based on information that is gathered by components of the cluster 104 and provided to the cluster visualization engine 190. In accordance with example implementations, the cluster visualization engine 190 receives at least part of the node status information from baseboard management controllers 123 that are associated with the nodes 122.

In accordance with example implementations that are described herein, the nodes 122 are contained within one or multiple rack-based computer systems 110 (also referred to as "racks"). The rack-based computer systems 110 of the cluster 104 may be located in one or multiple data centers, and the data centers may be geographically distributed. In general, the rack-based computer system 110 has modular cartridges, or units (called "chassis units" herein), which are mounted to frame members of a frame, or rack 114, of the system 110; and the chassis units are located in an interior space that is defined by the frame members. A given chassis unit may contain any of a number of different computer components and serve any of a number of different purposes. As examples, a given chassis unit may be a compute server; an application server; a storage server; an edge processing server; a blade enclosure; an enclosure containing tray-mounted server nodes; and so forth. In accordance with example implementations that are described herein, a given rack-based computer system 110 contains chassis units 118 that contain nodes 122 of the cluster 104. Depending on the particular implementation, a given rack-based computer system 110 may contain chassis units, other than chassis units 118 that contain nodes 122. For example implementations that are described herein, the chassis unit 118 may be a server blade enclosure that has slots (e.g., eight slots) to receive a number (e.g., eight) of corresponding server blades 121, and each server blade 121 may contain a number (e.g., four) of the nodes 122.

In accordance with example implementations, in addition to its nodes 122, the server blade 121 contains a baseboard management controller 123. As a more specific example, in accordance with some implementations, a rack-based computer system 110 may contain four vertically-arranged chassis units 118, with each chassis unit 118 containing thirty-two nodes 122 (for a total of 128 nodes for the rack-based computer system 110). In addition to the server blades 121, the chassis unit 118 may include other components, such as a network switch 124, a chassis management controller 126, and so forth. In accordance with further implementations, a particular rack-based computer system 110 may contain more or fewer than four vertically-arranged chassis units 118, may contain horizontally-arranged chassis units 118, and so forth.

The baseboard management controller 123 allows remote management of the server blade 121, including monitoring the physical states of the nodes 122 of the blade 121 and communicating with a management system through a management network. As examples of its roles, the baseboard management controller 123 may monitor sensors (e.g., temperature sensors, cooling fan speed sensors); monitor operating system statuses; monitor power statuses; log computer system events; and provide management functions for the server blade 121, which may be controlled remotely. Moreover, the baseboard management controller 123 may allow operations to be performed when the server blade 121 is powered down and before the nodes 122 of the blade 121 boot; and the baseboard management controller 123 may be used to perform recovery operations after an operating system or node 122 failure. In general, the baseboard management controller 123 provides power on status data for the nodes 122 of its server blade 121, and this status data may be processed by the cluster visualization engine 190 for purposes of generating the data (e.g., a text file) for the portion of the text character-based status visual for the nodes 122 of the server blade 121.

As used herein, a "baseboard management controller" is a specialized service processor that monitors the physical state of a server, node, or other hardware entity using sensors and communicates with a management system through a management network. The baseboard management controller 123 may communicate with applications executing at the operating system level through an input/output controller (IOCTL) interface driver, a representational state transfer (REST) application program interface (API), or some other system software proxy that facilitates communication between the baseboard management controller 123 and applications. The baseboard management controller 123 may have hardware level access to hardware devices located on the corresponding server blade 121, including system memory, local memories, and so forth. The baseboard management controller 123 may be able to directly modify the hardware devices. The baseboard management controller 123 may operate independently of the operating system instances of the server blade 121 and operate independently of the nodes 122 of the server blade 121. The baseboard management controller 123 may be located on a motherboard or main circuit board of the server blade 121. The fact that the baseboard management controller 123 is mounted on a motherboard of the managed server blade 121 or otherwise connected or attached to the managed server blade 121 does not prevent the baseboard management controller 123 from being considered "separate" from the nodes 122 of the server blade 121, which are being monitored/managed by the baseboard management controller 123. As used herein, a "baseboard management controller" has management capabilities for sub-systems of a computing device, and is separate from a processing resource that executes an operating system of the computing device. As such, the baseboard management controller 123 is separate from the nodes 122, which execute high-level operating system instances.

Among the other components of the rack-based computer system 110, the system 110 may, as depicted in FIG. 1, contain a top-of-the rack (TOR) network switch 136 and rack support units, such as one or multiple power distribution units (PDUs) 130 and a cooling distribution unit (CDU) 134. The PDU 130 conditions and distributes power to the components of the rack-based computer system 110. The PDU 130 may, for example, contain circuitry to receive three phase NC power and convert the three phase NC power to single phase AC power to the chassis units, which convert the AC power into DC power (via AC-to-DC power supplies or high power DC rectifiers) and distribute the DC power to the chassis unit backplane. In accordance with further example implementations, a PDU 130 may convert AC power into DC power, condition DC power, distributed DC power, and so forth. The CDU 134 is a heat exchanging unit, which removes waste heat from the rack-based computer system 110 so that the components of the system 110 remain within an acceptable thermal operating range. As an example, the CDU 134 may be a liquid-based cooling system that includes a secondary cooling loop to circulate and receive a liquid coolant that is circulated near heat dissipating components of the chassis units and the heat sinks mounted to these components. The CDU 134 may contain one or multiple heat exchangers to remove thermal energy from the liquid coolant of the secondary cooling loop and transfer this energy to a primary cooling loop.

In accordance with example implementations, entities of the cluster 104 other than or in addition to the baseboard management controllers 123 may provide status data for the nodes 122, which the cluster visualization engine 190 may use to generate data representing the text character-based status visual. Moreover, these entities may, in accordance with example implementations, provide information other than node status information, and the cluster visualization engine 190 may use this additional information to construct the text character-based status visual. For example, in accordance with some implementations, the chassis management controllers 126 may provide informational data for their chassis units 118, such as data representing the slot locations of the server blades 121, the locations of the chassis units 118 in their racks, identifying information for the rack-based computer system 110, statuses for the server blades 121, and so forth. From this information, the cluster visualization engine 190 may, for example, identify the specific location (e.g., a rack identifier, a chassis unit identifier, a data center identifier, and so forth) of each node 122 and correspondingly arrange the text character that represents the status of the node 122 in the appropriate location in the text character-based status visual, such that the text characters of the visual have a spatial organization that corresponds to the physical layout (a layout corresponding to node locations) of the cluster 104. For example, in the text character-based status visual, node statuses for nodes of a particular chassis unit 118 may be grouped together; node statuses for nodes of a particular rack-based computer system 110 may be grouped together; node statuses for nodes of a particular row of rack-based computer systems 110 may be grouped together; node statuses for nodes of a particular data center may be grouped together; and so forth.

Figure 2:
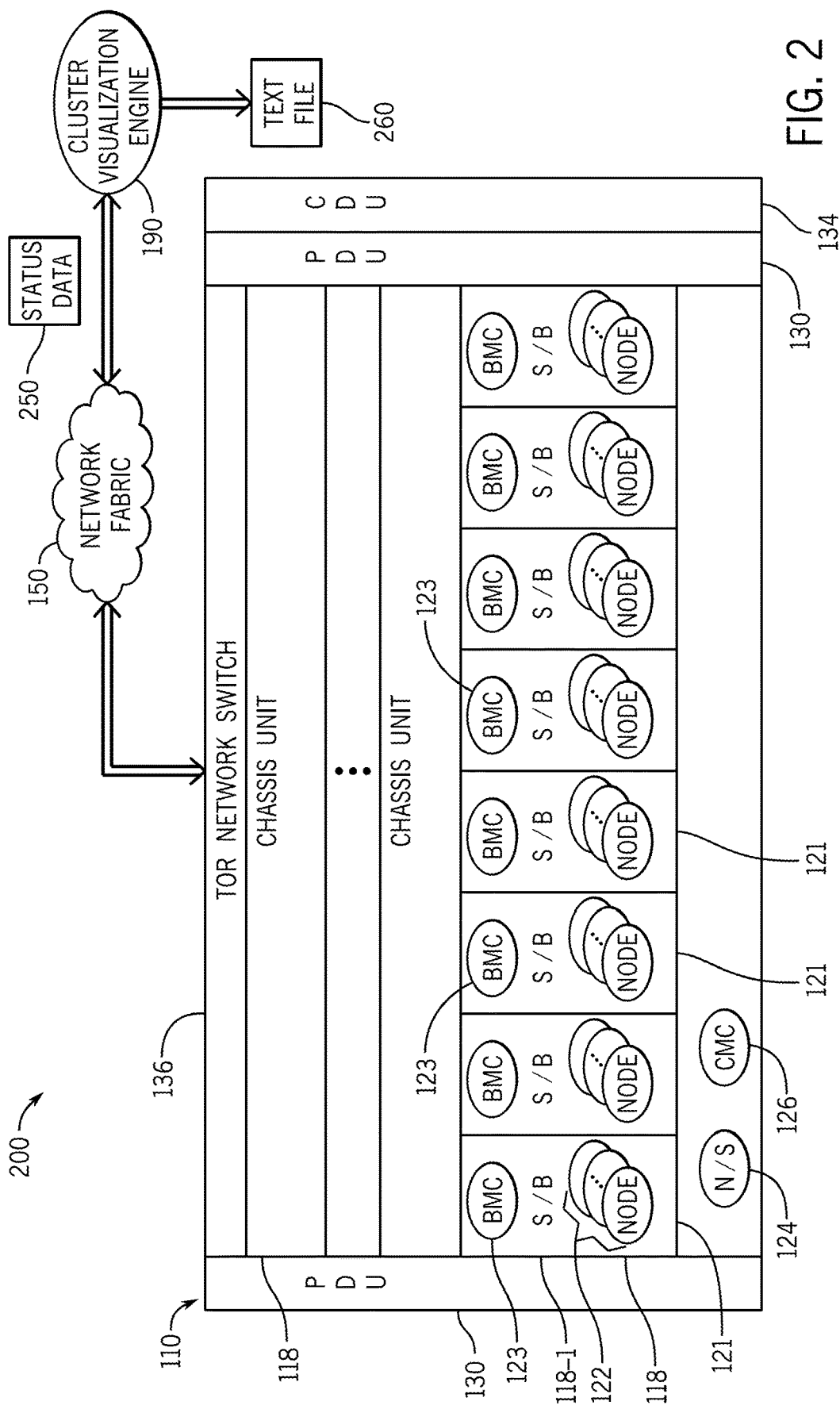
FIG. 2 is an illustration of the cluster visualization engine generating a text file representing a text character-based status visual for nodes of a rack-based computer system according to an example implementation.
Figure 3:
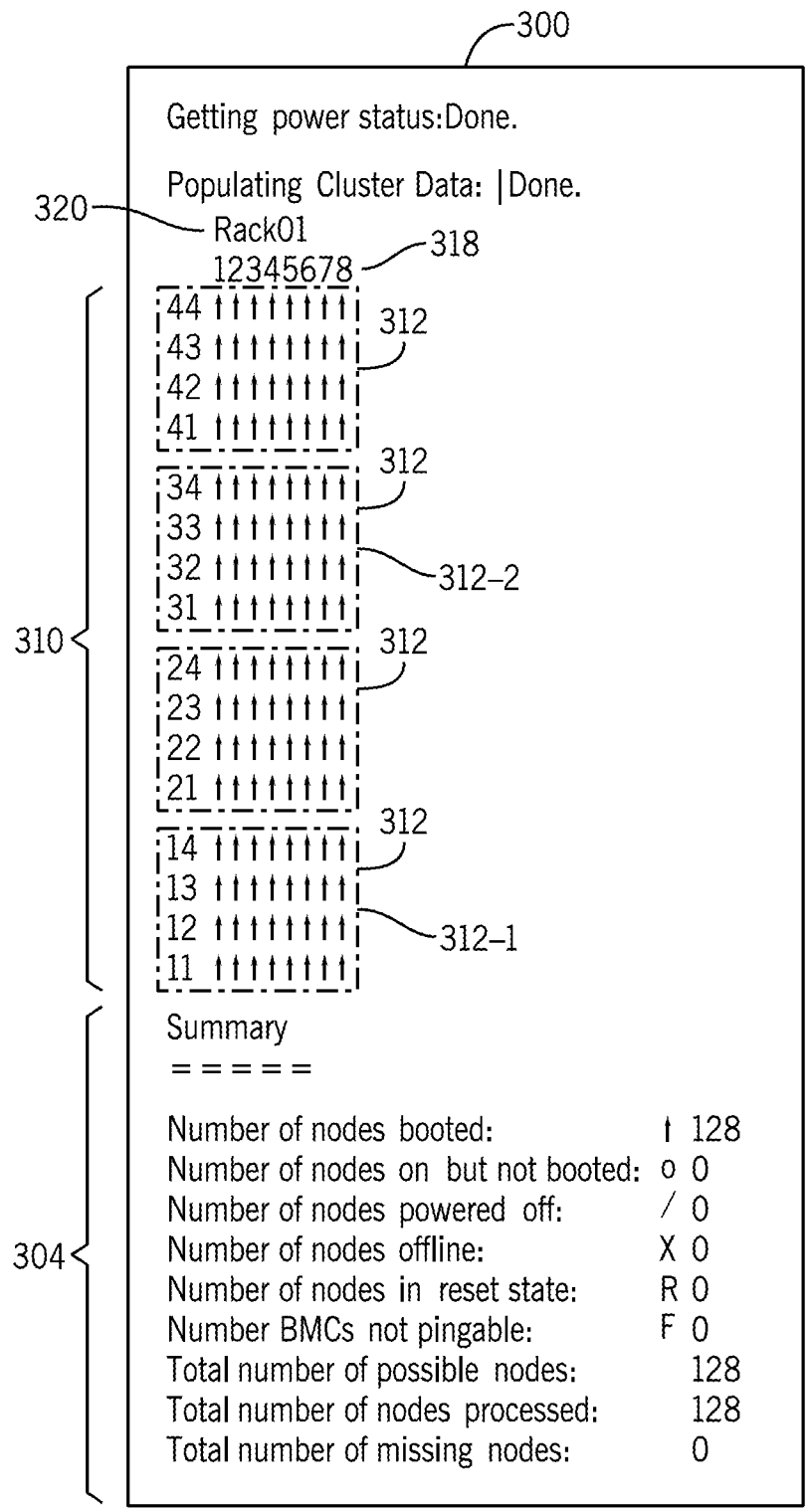
FIG. 3 is an illustration of a text character-based status visual that shows power on statuses for nodes of the rack-based computer system of FIG. 2 according to an example implementation.

FIG. 2 is an illustration 200 of the cluster visualization engine 190 generating a text file 260, based on status data 250, for an example rack-based computer system 110; and FIG. 3 is an example of a corresponding text character-based status visual 300. Referring to FIG. 2, for this example, the rack-based computer system 110 includes multiple chassis units 118. As specifically illustrated for chassis unit 118-1, the chassis unit contains eight server blades 121. In addition to containing a number of nodes 122 (e.g., four nodes 122), the server blade 121, in accordance with example implementations, includes other components, such as a network interface and a baseboard management controller 123.

Referring also to FIG. 3, for this example, the text character-based status visual 300 has a section 310 that contains individual node power on statuses and a summary section 304 for the power on statuses. For this example, the power on statuses for the rack-based computer system 110 are assigned a corresponding rack label 320 (here, "Rack01"). In the section 310, the power on statuses for each chassis unit 118 are spatially grouped together in a matrix, or grid 312, to coincide with the chassis unit 118 and the corresponding node locations within the chassis unit 118. Moreover, the grids 312 are spatially oriented in the visual 300 to coincide with the locations of the corresponding chassis units 118 in the rack-based computer system 110. As an example, the grid 312 labeled with the specific reference numeral 312-1 is the bottommost grid 312 in the text character-based status visual 300 and corresponds to the bottommost chassis unit 118; example grid 312-2 is the third grid 312 from the bottom in the text character-based status visual 300 and corresponds to the third chassis unit 118 from the bottom; and so forth.

The row of each grid 312 is labeled with a two digit numerical label. The first digit of the label references the associated chassis unit 118. Using the grid 312-1 as an example, the first digit of each of its row labels "11," "12," "13," and "14," is "1" (i.e., the rows correspond to the bottommost chassis unit 118); and for the grid 312-2, the first digit of each of its row labels "31," "32," "33," and "34," is "3" (i.e., the rows correspond to the third chassis unit 318 from the bottom). The second digit of the row labels references the location of the node 122 within the server blade 121. For the example text character-based status visual 300, there are eight nodes 122 per server blade 121, and the nodes 122 within each server blade 121 are assigned numbers according to their respective locations on the server blade 121. As depicted at reference numeral 318, the eight nodes 122 are denoted by corresponding column labels "1" to "8." For example, the eight text characters in row 11 represent the statuses for "Node 1" for the eight corresponding server blades of the bottommost chassis unit 118. Continuing the example, the eight text characters in row 32 represent the statuses for "Node 2" for the eight corresponding server blades of the third chassis unit 118 from the bottom.

In accordance with example implementations, the cluster visualization engine 190 selects one of the following text characters to be a status indicator to represent the power on status of a corresponding node 122 in the text character-based status visual:

"↑" represents that the node 122 is fully booted;
"○" represents that the node 122 is powered on but not fully booted;
"/" represents that the node 122 is powered off;
"X" represents that the node 122 is offline;
"R" represents that the node 122 is in a reset state;
"F" represents that the associated baseboard management controller 123 is not reachable, or "pingable"; and
"_" represents that the node 122 is missing.

The "↑" fully booted state refers to the node 122 loading and transferring control to the operating system, such that the node 122 has powered up and executes an operating system instance. For the example text character-based status visual 300 of FIG. 3, all 128 nodes 122 have fully booted and as such, have a corresponding "↑" character in the visual 300. It is noted that correspondingly, the text character-based status visual 300, for this example, does not represent states other than the "↑" fully booted state.

The "○" powered on but fully booted state refers to the node 122 being in the process of undergoing its boot sequence. The "/" powered off state represents that the node 122 is powered down, although its associated baseboard management controller 123 is still reachable to manage operations of the server blade 121. The "X" offline state represents that network communication node 122 does not exist, although its associated baseboard management controller 123 is still reachable through out-of-band management network communication. The "R" reset state represents that the node 122 is being held in or is constantly being cycled to a reset state, which would occur, for example, due to a particular fault (e.g., a hardware fault, a software fault, a cryptographic security check fault, and so forth). The "_" baseboard management controller 123 not being reachable state represents the inability to access the associated baseboard management controller 123 via a sideband management network channel.

As also depicted in the text character-based status visual 300, in accordance with some implementations, the summary section 304 summarizes the aggregated values for the different states of the nodes 122. More specifically, as depicted in FIG. 3, in accordance with example implementations, the summary section 304 may contain text characters representing the number of possible nodes 122 (i.e., the number of nodes 122 in the rack-based computer system 110 of FIG. 2, which are supposed to be present, as reflected by cluster inventory data), the total number of nodes 122 processed (i.e., the number of nodes 122 that were observed to be present based on the status data); and the total number of missing nodes 122 (i.e., the number of nodes 122 that were not reachable).

In accordance with example implementations, the cluster visualization engine 190 may select a particular color for a text character for purposes of representing an additional attribute of the corresponding node 122 (e.g., an attribute for the node 122, other than a power on status). For example, in accordance with some implementations, the cluster visualization engine 190 may assign a red color to a particular "↑" text character (assuming the corresponding node 122 is fully booted) to indicate a high temperature condition for a corresponding node 122 and assign a blue color to the "↑" text character to represent that the corresponding node 122 has a normal operating temperature. Text colors representing node temperatures are merely an example, as text colors may be used to indicate a wide variety of attributes, or characteristics, for a given node 122, such as CPU temperature, CPU load, CPU utilization, memory temperature, energy use, ambient air temperature, and so forth.

Figure 4:
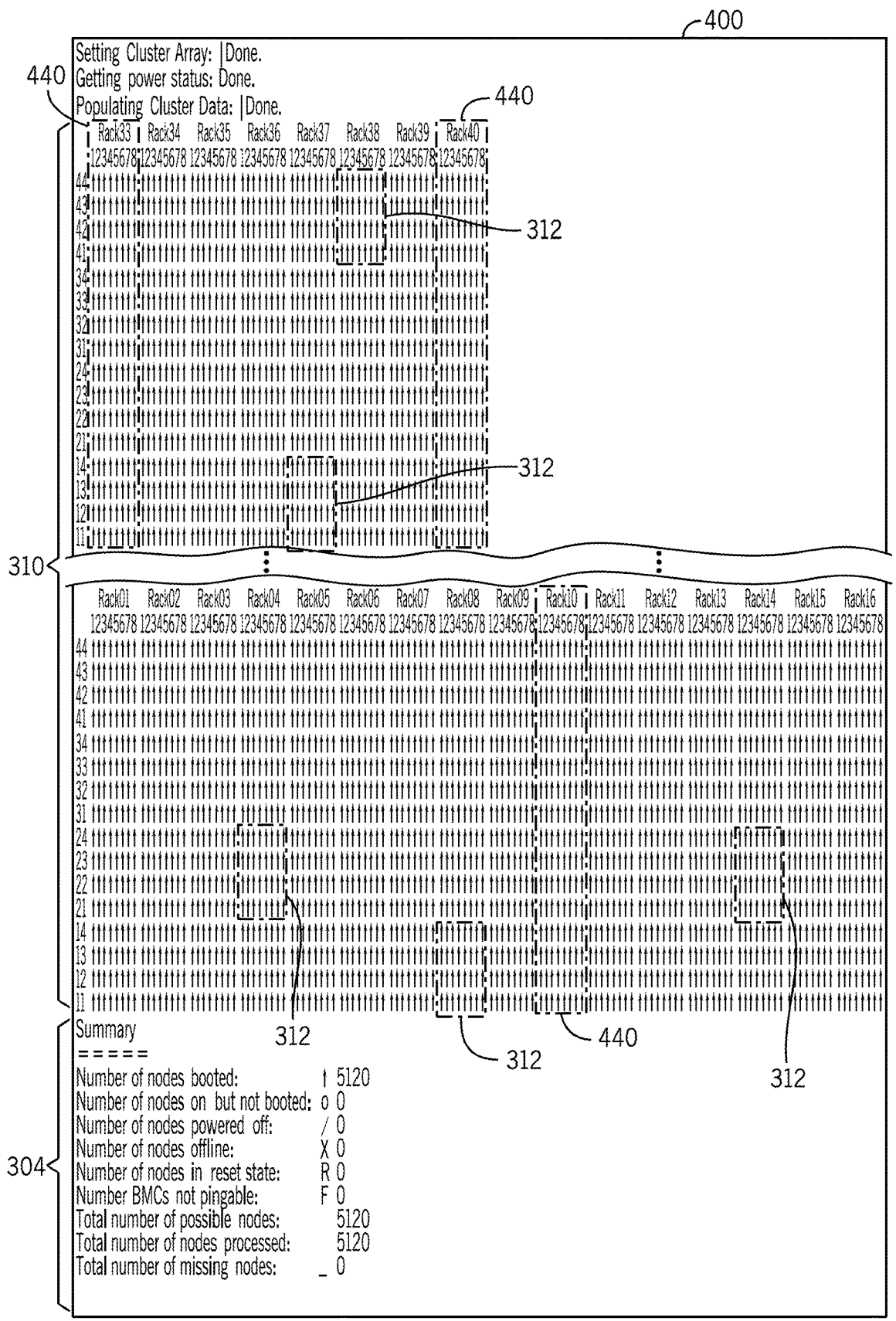

FIG. 4 depicts an example text character-based status visual 400 for a cluster of 5,120 nodes (i.e., forty rack-based computer systems 110, with each system 110 having 128 nodes). For this particular example, all 5,120 nodes have fully booted. Similar to the text character-based status visual 300 of FIG. 3, the visual 400 contains a section 310 that contains individual node power on statuses and a summary section 304 for the power on statuses. Unlike the text character-based status visual 300, the visual 400 represents power on status groups 440 for multiple rack-based computer systems 110. Each group 440 may be assigned a label (Rack01, Rack02, and so forth) that associates the group 440 with a particular rack-based computer system. Moreover, in accordance with some implementations, the groups 440 may be spatially arranged in the text character-based status visual 400 to coincide with the location of the corresponding rack-based computer system. As examples, the different rows of groups 440 may correspond to different data centers; the bottom and middle rows of groups 440 of the text character-based status visual 400 may correspond to a single data center, with the spatial orientations of these groups in the visual 400 corresponding to the locations of the corresponding rack-based computer systems in rows of the data center; all of the groups 440 of the visual may correspond to a single data center, with the spatial orientations of these groups in the visual 400 corresponding to the locations of the corresponding rack-based computer systems in the rows of the data center; and so forth.

Figure 5:
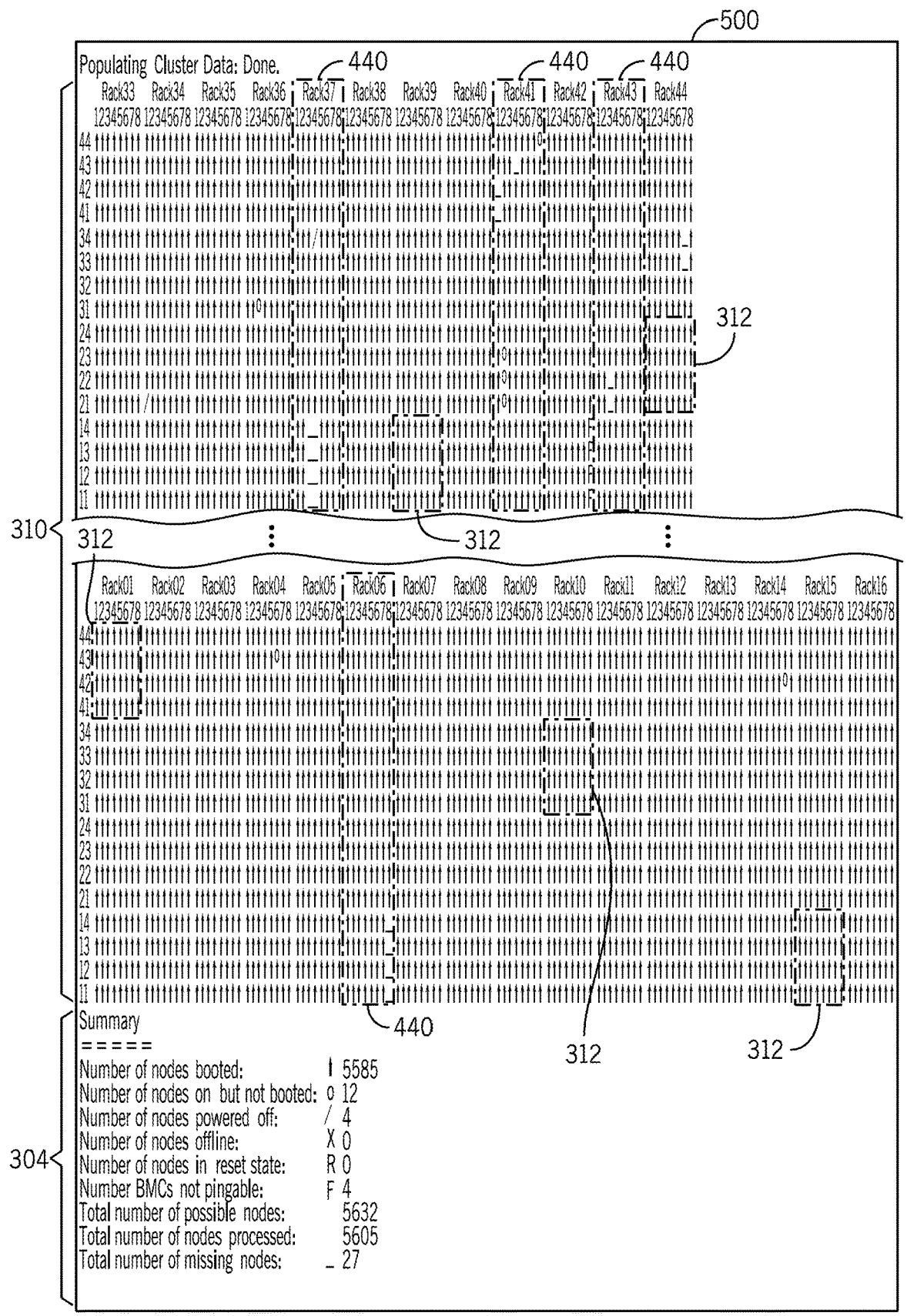

FIG. 5 is an example of another text character-based status visual 500 depicting the power on statuses of 5,632 nodes (i.e., forty-four rack-based computer systems 110, with each system 110 having 128 nodes). Not all of the nodes 122 are fully booted for this example; but rather, some nodes 122 have different statuses other than fully booted. For example, for the group 440 of text characters corresponding to "Rack37," the corresponding text characters represent that all of the nodes 122 of two adjacent server blades 121 (i.e., eight nodes total) are missing. The visualization allows a trend to be easily spotted, which enhances troubleshooting. For example, for the Rack37 system, network components (e.g., a TOR switch) that the eight nodes 122 share may be further evaluated to identify the problem. The group 440 of text characters corresponding to "Rack06," represents that all of the nodes 122 of a single server blade 121 are missing, which may be indicative of a network component failure or perhaps a server blade problem. For group 440 corresponding to "Rack43," the corresponding text characters represent that two nodes 122 of a server blade 120 are missing, which may be indicative of a motherboard problem with the server blade 121. For the group 440 corresponding to "Rack41," in the second chassis unit 118 from the bottom, a server blade 121 has three nodes 122 powered on (but not fully booted) and one node 122 fully booted. This may be indicative of no hardware fault, but rather, there may be a timing issue or a congestion issue to be addressed.

FIG. 6 is an example of another text character-based status visual 600 depicting the power on statuses of 5,120 nodes 122, depicting 4,249 nodes 122 as being fully booted. As can be seen by the group 440 corresponding to the nodes 122 of "Rack34," all of the nodes 122 are powered on but have not been booted. This trend indicates that a network component has failed. For the group 440 corresponding to "Rack37," all of the nodes 122 corresponding to the third chassis unit from the bottom have booted, but the remaining nodes 122 have not booted, which may indicate a specific network component failure. In this manner, an entire chassis of nodes may be in a powered on state but may not have booted, due to a network component failing.

Figure 7:
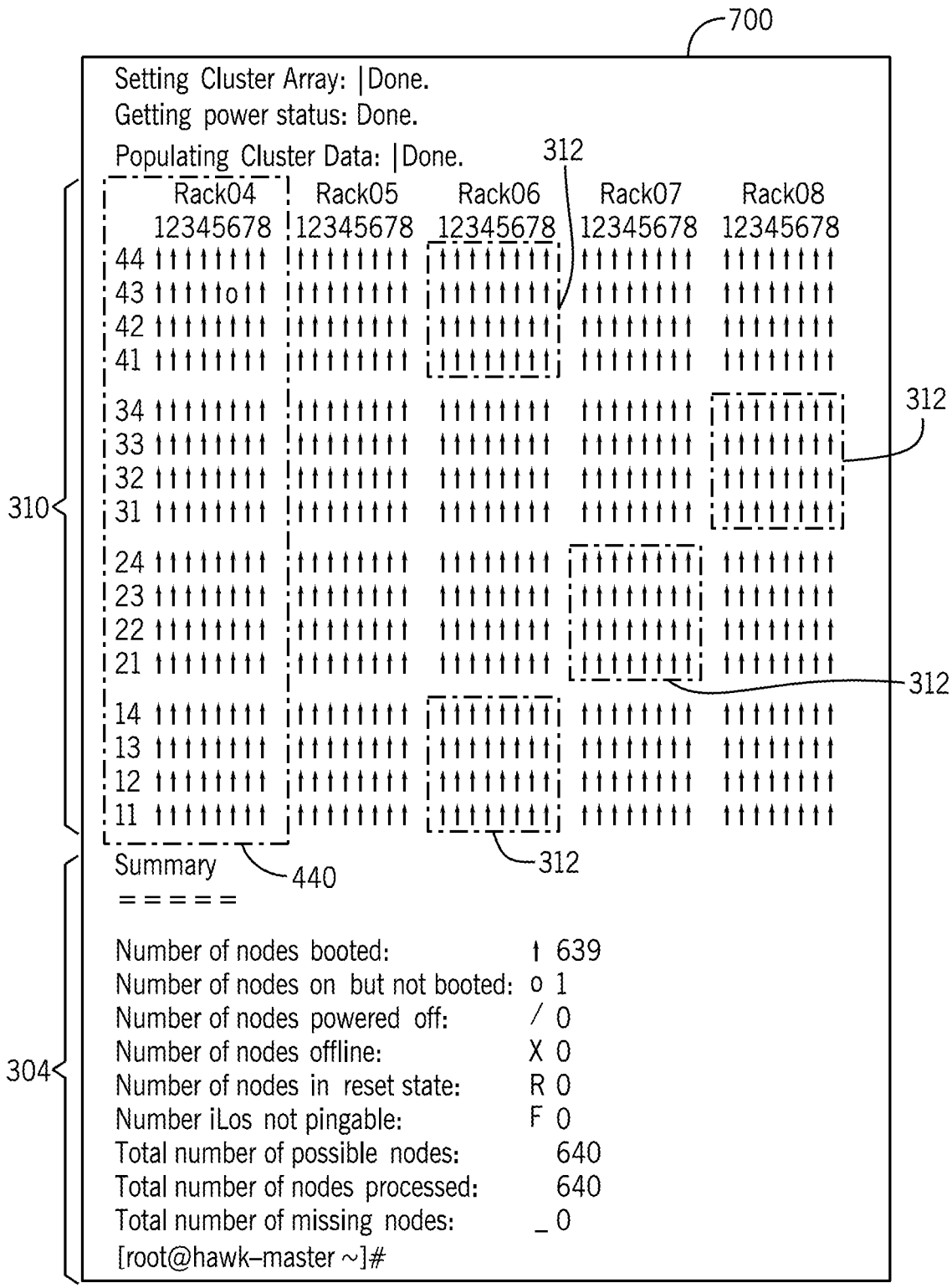

FIG. 7 is another example of a text character-based status visual 700 depicting the power on statuses of 640 nodes 122. This visual 700 illustrates the ability to quickly identify an unbooted node 122, which here, is a node depicted in the group 440 corresponding to "Rack04."

Figure 8:
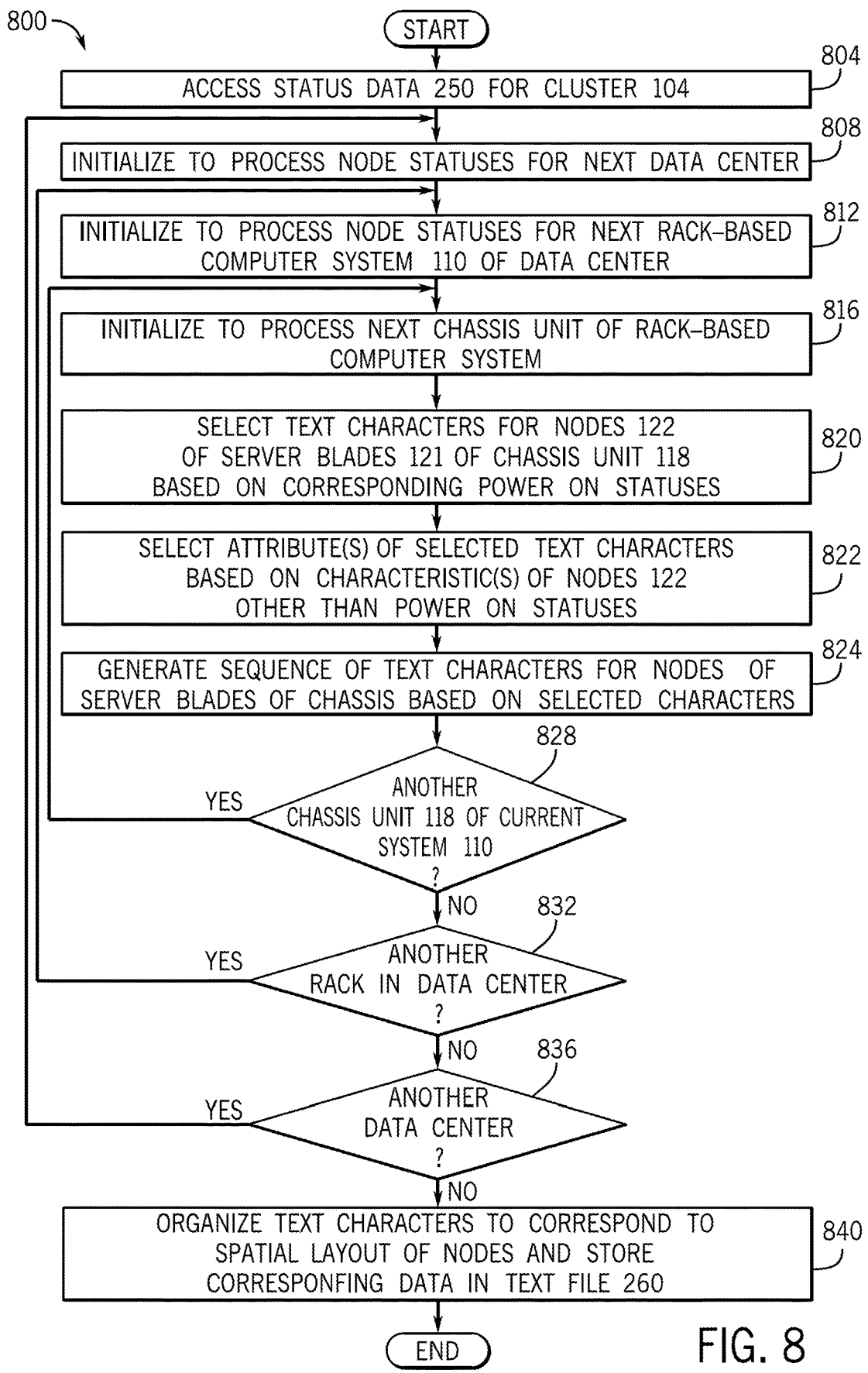
FIG. 8 is a flow diagram depicting a technique to generate a text file containing data representing a text character-based status visual showing cluster node statuses according to an example implementation.

FIG. 8 depicts an example process 800 that may be performed by the cluster visualization engine 190 in accordance with some implementations. Although FIG. 8 depicts a sequential process for stepping through the statuses for each node 122 of a cluster 104, it is noted that some parts of the process 800 may be performed in parallel in accordance with further implementations.

Referring to FIG. 8 in conjunction with FIG. 1, in accordance with some implementations, pursuant to the process 800, the cluster visualization engine 190 accesses (block 804) status data 254 for the cluster 104 and then begins the process in which the statuses are processed one rack-based computer system 110 at a time for purposes of determining the corresponding text characters to represent the power on statuses for the nodes of the system 110. More specifically, as depicted in FIG. 8, pursuant to the process 800, the cluster visualization engine 190 initializes (block 808) to process the node status for the next data center; initializes (block 812) to process the node statuses for the next rack-based computer system of the data center; and initializes (block 816) to process the next chassis unit 118 of the rack.

Pursuant to block 820, the cluster visualization engine 190 selects (block 820) the text characters for the nodes 122 of the rack-based computer system 110 and selects (block 822) the attributes of the text characters based on one or multiple characteristics of the nodes. The cluster visualization engine 190 then generates (block 824) a sequence of text characters for the nodes based on the selected characters. If, pursuant to decision block 828, there is another chassis unit of the current rack to process, then control returns to block 816. Otherwise, the cluster visualization engine 190 determines (decision block 832) whether there is another rack of the datacenter to process, and if so, control returns to block 812. Otherwise, the cluster visualization engine 190 determines (decision block 836) whether there is another datacenter to process, and if so, control returns to block 808. When all of the statuses for all of the nodes 122 of the cluster 104 have been processed, as depicted in block 840, FIG. 8, the cluster visualization engine 190 organizes the text characters to correspond to the spatial layout of the nodes 122 and stores the corresponding data in the text file 260.

Other implementations are contemplated, which are within the scope of the appended claims. For example, in accordance with example implementations, a user may request the cluster visualization engine 190 (FIG. 1) to provide a text character-based status visual for nodes that are selected based on a single criterion or multiple criteria. In accordance with further implementations, the text character-based status visual may contain additional information that allows monitoring of attributes, or characteristics, of the rack-based computer systems 110, other than power on statuses of the nodes 122.

For example, in accordance with some implementations, the text character-based status visual may represent a CPU temperature of a given node 122, and based on the CPU temperature, the cluster visualization engine 190 may select a particular color for the text character that represents the power on status for the node 122. For example, a color associated with a cooler temperature, such as "blue," may be selected as the color of the text character for the power on status of the node 122, for the case in which the temperature is within a normal operating temperature range. However, for the case in which the operating temperature of the node 122 is above an acceptable level, then, the cluster visualization engine 190 may select another color (e.g., yellow, orange or red), depending on the particular temperature range in which the temperature of the node 122 falls. As other examples, the color for a particular text character may be selected to represent attributes other than a CPU temperature, such as a temperature of a memory, a temperature of another component of the chassis unit 118, and so forth. Moreover, the attribute may be an attribute other than temperature. In accordance with further example implementations, the text character-based status visual may contain text characters that represent statuses of components other than nodes, such as text characters that represent CDU and/or PDU statuses.

Figure 9:
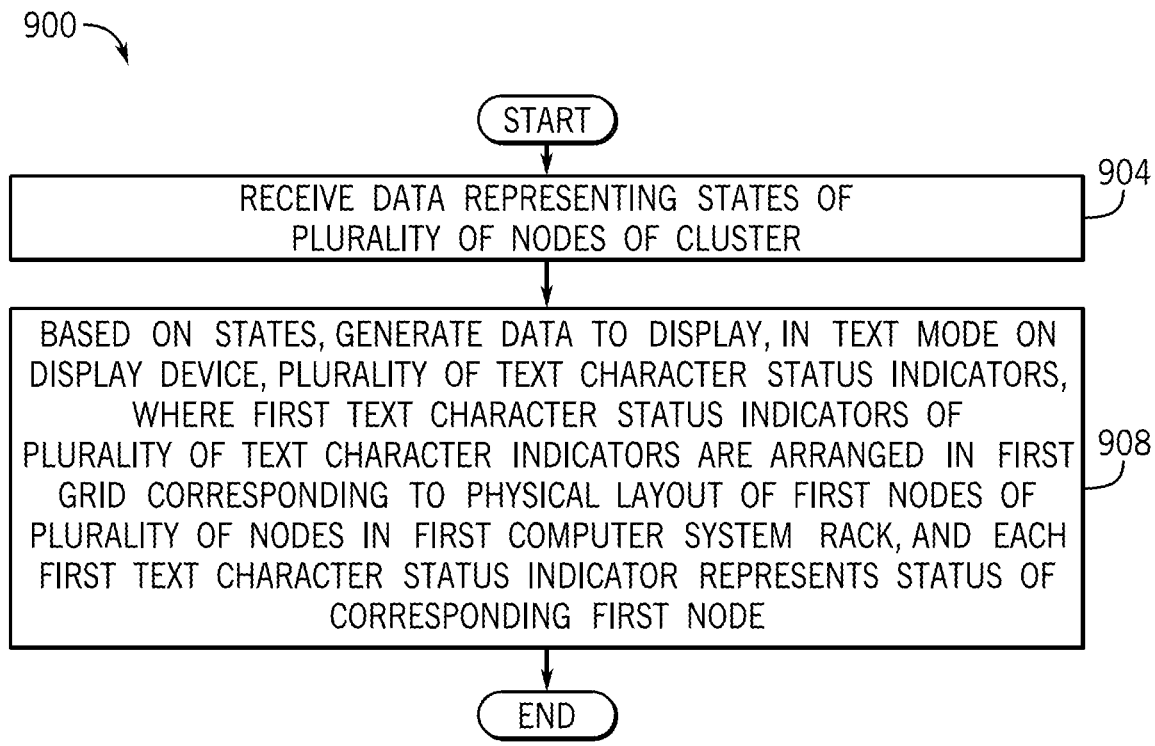
FIG. 9 is a flow diagram depicting a process to generate data to display text character status indicators representing statuses of nodes of a cluster according to an example implementation.

Referring to FIG. 9, in accordance with example implementations, the process 900 includes receiving (block 904) data representing states of a plurality of nodes of a cluster. Pursuant to the process 900, based on the state, data is generated (block 908) to display, in a text mode on a display device, a plurality of text character status indicators. First text character status indicators are arranged in a first grid corresponding to a physical layout of first nodes, and each first text character status indicator represents a status of a corresponding first node.

Figure 10:
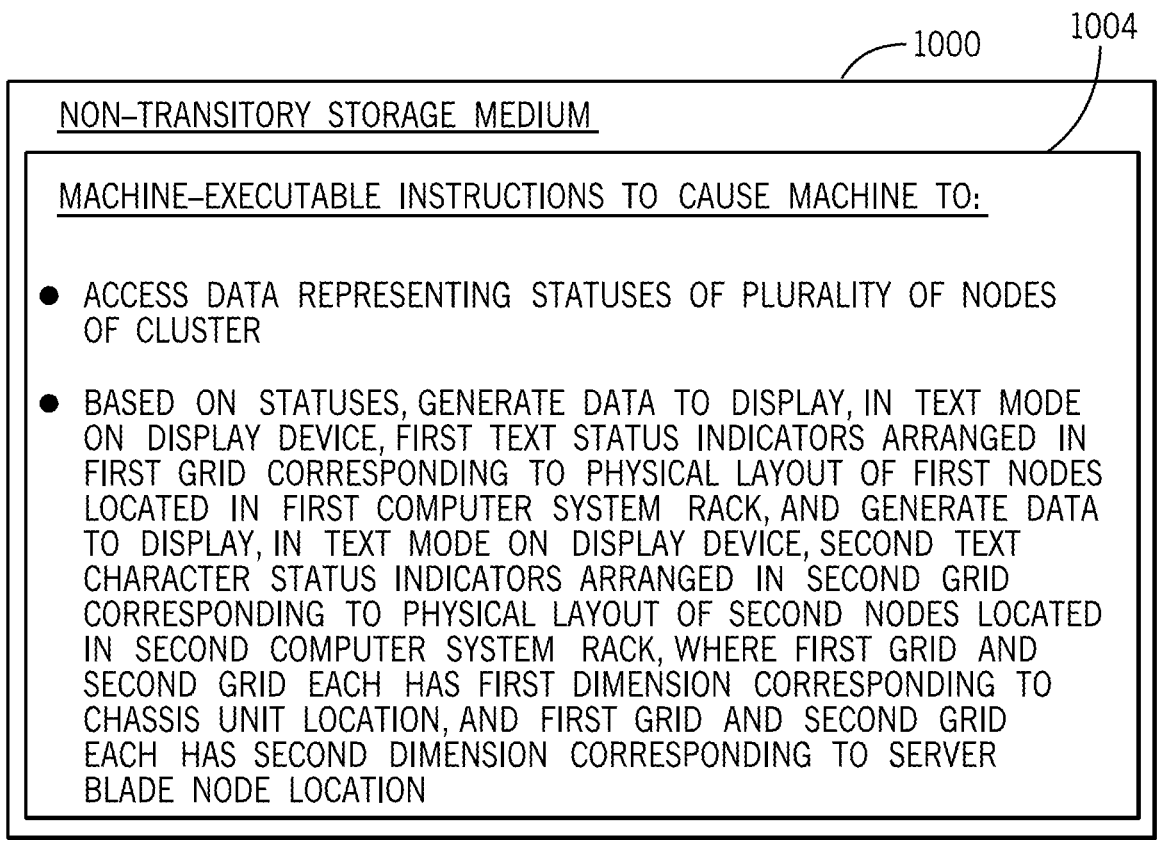
FIG. 10 is an illustration of machine-executable instructions stored on a non-transitory storage medium to cause a machine to generate data to display text characters representing statuses of nodes of a cluster according to an example implementation.

Referring to FIG. 10, in accordance with example implementations, a non-transitory storage medium 1000 stores machine-executable instructions 1004 that, when executed by a machine, cause the machine to access data that represents statuses of a plurality of nodes of a cluster. The instructions 1004, when executed by the machine, further cause the machine to, based on the statuses, generate data to display, in a text mode on a display device, first text status indicators that are arranged in a first grid that corresponds to a physical layout of first nodes of the plurality of nodes located in a first computer system rack. The instructions, when executed by the machine, further cause the machine to, based on the statuses, generate data to display, in the text mode on the display device, second text character status indicators, which are arranged in a second grid other than the first grid corresponding to a physical layout of second nodes of the plurality of nodes that are located in a second computer system rack other than the first computer system rack. The first grid and the second grid each has a first dimension that corresponds to a chassis unit location. The first grid and the second grid each has a second dimension that corresponds to a server blade node location.

Figure 11:
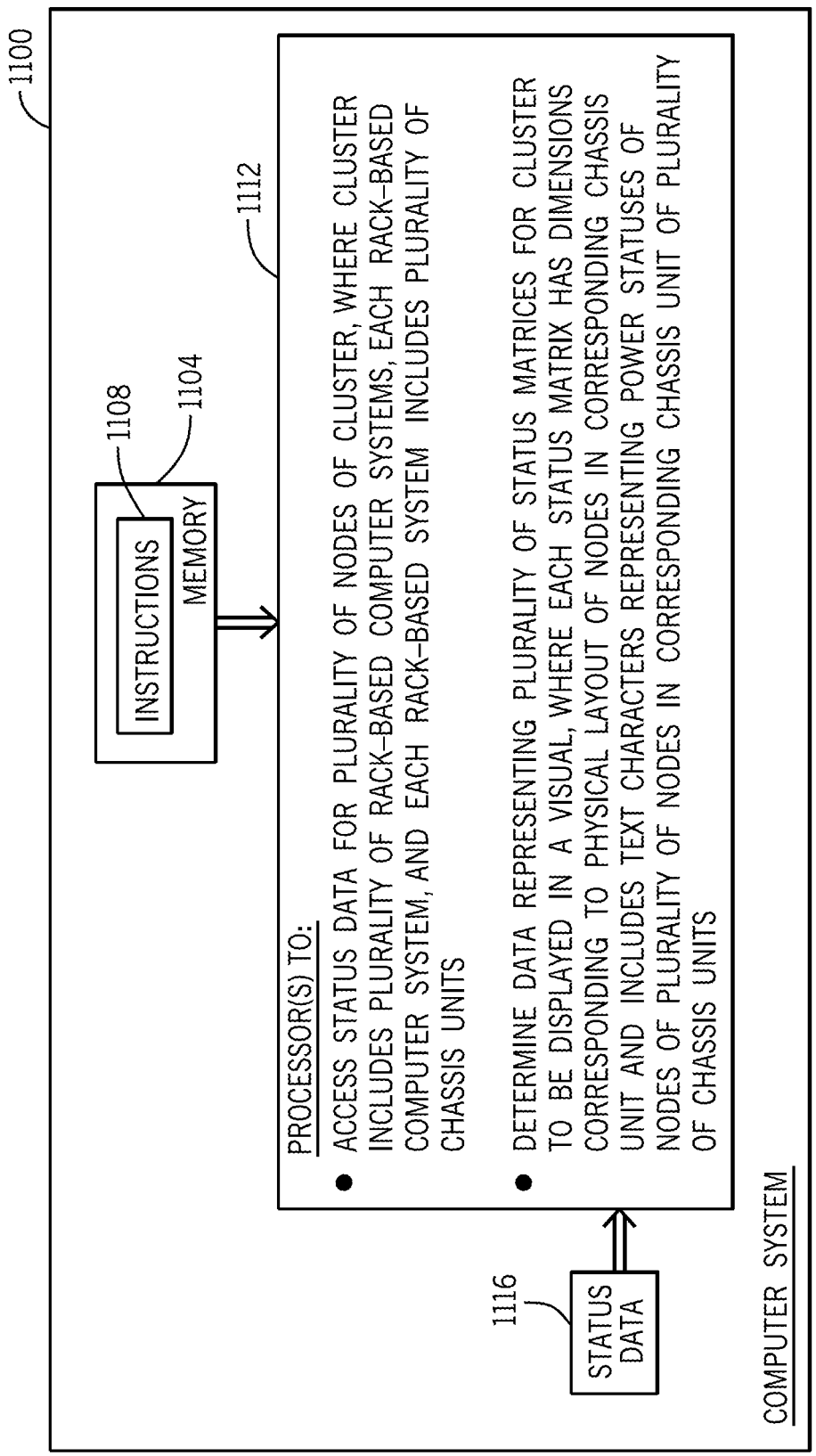
FIG. 11 is a schematic diagram of a computer system to generate data representing status matrices containing text characters representing power statuses of nodes of a cluster according to an example implementation.

Referring to FIG. 11, in accordance with example implementations, a computer system 1100 includes at least one processor 1112 and a memory 1104 to store instructions 1108 that, when executed by the processor(s) 1112, cause the processor(s) 1112 to access status data for a plurality of nodes of a cluster. The cluster includes a plurality of rack-based computer systems, and each rack-based computer system includes a plurality of chassis units. The instructions 1108, when executed by the processor(s) 1112, further cause the processor(s) 1112 to determine data representing a plurality of status matrices for the cluster to be displayed in a screenshot image. Each status matrix has dimensions that correspond to a physical layout of the nodes in the corresponding chassis unit and includes text characters that represent power statuses of nodes in a corresponding chassis unit.

In accordance with example implementations, the first grid is associated with a first chassis unit of the first computer system rack; and generating the data further includes generating data to display, in the text mode of the display device, second text character status indicators arranged in a second grid other than the first grid. The second grid corresponds to a physical layout of second nodes of the plurality of nodes; and the second nodes are arranged in a second chassis unit of the first computer system rack. A particular advantage is that status indicators for nodes may be displayed in a manner that is conducive for the human mind to process, thereby allowing problematic trends with the cluster to be easily identified.

In accordance with example implementations, generating the data further includes generating the data to orient the first grid and the second grid along a dimension representing a chassis unit location. A particular advantage is that the orientation of the status indicators may correspond to a physical, spatial layout of the nodes, thereby allowing problematic trends with the cluster to be readily identified.

In accordance with example implementations, generating the data further includes generating data to display, in the text mode of the display device, second text character status indicators that are arranged in a second grid. The second grid corresponds to a physical layout of second nodes of the plurality of nodes, and the second nodes are located in a second computer system rack. A particular advantage is that the orientation of the status indicators may correspond to a physical, spatial layout of the nodes, thereby allowing problematic trends with the cluster to be readily identified.

In accordance with example implementations, the first text character status indicators are associated with a chassis unit of a plurality of chassis units of the first computer system rack. Generating the data further includes generating data to, based on the states, display, in the text mode on the display device, a screenshot. The screenshot includes the first text character status indicators and second text character status indicators that are arranged in a plurality of grids. The plurality of grids correspond to a plurality of computer system racks. A particular advantage is that the orientation of the status indicators may correspond to a physical, spatial layout of the nodes, thereby allowing problematic trends with the cluster to be readily identified.

In accordance with example implementations, the first grid extends in a first dimension associated with a server blade location, and the first grid extends in a second dimension that is associated with a server blade node location. A particular advantage is that the orientation of the status indicators may correspond to a physical, spatial layout of the nodes, thereby allowing problematic trends with the cluster to be readily identified.

In accordance with example implementations, each text character status indicator represents a power on status of a corresponding node. A particular advantage is that the orientations of the power on status indicators may correspond to a physical, spatial layout of the nodes, thereby allowing problematic trends with boot-related problems to be readily identified.

In accordance with example implementations, the power on status includes at least one of a state representing that the corresponding node is fully booted, a state representing that the corresponding node is powered on, a state representing that the corresponding node is powered off, a state representing that the corresponding node is in a reset state, a state representing that the corresponding node is offline, or a state representing that a baseboard management controller of the corresponding node is not responding. A particular advantage is that the orientations of the power on status indicators may correspond to a physical, spatial layout of the nodes, thereby allowing problematic trends with boot-related problems to be readily identified.

In accordance with example implementations, a given text character status indicator represents a characteristic that is provided by a sensor device of a corresponding node. The characteristic includes a central processing unit (CPU) temperature, a memory temperature, or an ambient air temperature. A particular advantage is that the orientations of the status indicators may correspond to a physical, spatial layout of the nodes, thereby allowing problematic trends with the cluster to be readily identified.

In accordance with example implementations, a given text character status indicator represents an energy use or a central processing unit (CPU) load of a corresponding node. A particular advantage is that the orientations of the status indicators may correspond to a physical, spatial layout of the nodes, thereby allowing problematic trends with the cluster to be readily identified.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   receiving data representing states of a plurality of nodes of a cluster; and
   based on the states, generating data to display, in a text mode on a display device, a plurality of text character status indicators, wherein first text character status indicators of the plurality of text character status indicators are arranged in a first grid corresponding to a physical layout of first nodes of the plurality of nodes in a first computer system rack, and each first text character status indicator comprises a text character that individually represents a status of a corresponding first node of the first nodes.

2. The method of claim 1, wherein:
   the first grid is associated with a first chassis unit of the first computer system rack;
   generating the data further comprises generating data to display, in the text mode on the display device, second text character status indicators of the plurality of text character status indicators arranged in a second grid other than the first grid;

the second grid corresponds to a physical layout of second nodes of the plurality of nodes; and the second nodes are located in a second chassis unit of the first computer system rack.

3. The method of claim 2, wherein generating the data further comprises generating the data to orient the first grid and the second grid along a dimension representing a chassis unit location.

4. The method of claim 1, wherein:
generating the data further comprises generating data to display, in the text mode of the display device, second text character status indicators of the plurality of text character status indicators arranged in a second grid other than the first grid;
the second grid corresponds to a physical layout of second nodes of the plurality of nodes; and
the second nodes are located in a second computer system rack.

5. The method of claim 1, wherein:
the first text character status indicators are associated with a chassis unit of a plurality of chassis units of the first computer system rack; and
generating the data further comprises generating data to, based on the states, display, in the text mode on the display device, a screenshot comprising:
the first text character status indicators; and
second text character status indicators of the plurality of text character status indicators arranged in a plurality of grids other than the first grid, wherein the plurality of grids correspond to a plurality of computer system racks other than the first computer system rack.

6. The method of claim 1, wherein the first grid extends in a first dimension associated with a server blade location, and the first grid extends in a second dimension associated with a server blade node location.

7. The method of claim 1, further comprising generating the data in response to a command entered on a command line interface.

8. The method of claim 1, wherein each text character status indicator of the plurality of text character status indicators represents a power on status of a corresponding node of the plurality of nodes.

9. The method of claim 8, wherein the power on status comprises at least one of a state representing the corresponding node is fully booted, a state representing the corresponding node is powered on, a state representing the corresponding node is powered off, a state representing the corresponding node is in a reset state, a state representing the corresponding node is offline, or a state representing a baseboard management controller of the corresponding node is not responding.

10. The method of claim 1, wherein:
a given text character status indicator of the plurality of text character status indicators represents a characteristic provided by a sensor device of a corresponding node of the plurality of nodes; and
the characteristic comprises a central processing unit (CPU) temperature, a memory temperature, or an ambient air temperature.

11. The method of claim 1, wherein a given text character status indicator of the plurality of text character status indicators represents an energy use or a central processing unit (CPU) load of a corresponding node of the plurality of nodes.

12. A non-transitory storage medium to store machine readable instructions that, when executed by a machine, cause the machine to:
access data representing statuses of a plurality of nodes of a cluster; and
based on the statuses, generate data to display, in a text mode on a display device, first text status indicators arranged in a first grid corresponding to a physical layout of first nodes of the plurality of nodes located in a first computer system rack, and generate data to display, in the text mode on the display device, second text character status indicators arranged in a second grid other than the first grid corresponding to a physical layout of second nodes of the plurality of nodes located in a second computer system rack other than the first computer system rack.

13. The non-transitory storage medium of claim 12, wherein:
a given text status indicator of the first text status indicators and the second text status indicators represents a power on state of the corresponding node; and
the instructions, when executed by the machine, further cause the machine to provide data representing a color for the given text status indicator to represent an additional characteristic of the corresponding node.

14. The non-transitory storage medium of claim 12, wherein the instructions, when executed by the machine, further cause the machine to:
generate the data to cause the first text status indicators to have a spatial arrangement that corresponds to physical locations of the plurality of nodes in the first computer system rack; and
generate the data to cause the second text status indicators to have a spatial arrangement that corresponds to physical locations of the plurality of nodes in the second computer system rack.

15. The non-transitory storage medium of claim 12, wherein the instructions, when executed by the machine, further cause the machine to:
determine the first text status indicators based on power states of the plurality of nodes;
determine the second text status indicators based on the power states; and
for a given text status indicator of the first text status indicators and the second text status indicators, determine a color of the given text character based on a characteristic of the corresponding node other than the power state of the corresponding node.

16. The non-transitory storage medium of claim 12, wherein the instructions, when executed by the machine, further cause the machine to:
based on the data, generate data to display, in a single screen image, additional text status indicators arranged in a third grid corresponding to a physical layout of third nodes of the plurality of nodes located in a third computer system rack other than the first computer system rack and the second computer system rack.

17. The non-transitory storage medium of claim 12, wherein the first grid and the second grid each has a first dimension corresponding to a chassis unit location, and the first grid and the second grid each has a second dimension corresponding to a server blade node location.

18. A computer system comprising:
a memory to store instructions; and
at least one processor that executes the instructions and responsive to executing the instructions:

determines data representing a plurality of status matrices for a cluster to be displayed in a screenshot image, wherein each status matrix of the plurality of status matrices has dimensions corresponding to a physical layout of nodes of the cluster in a corresponding chassis unit of a plurality of chassis units and comprises text characters representing power statuses of the nodes.

19. The computer system of claim 18, wherein the at least one processor, responsive to executing the instructions:
groups the status matrices according to rack-based computer systems containing the corresponding chassis units.

20. The computer system of claim 18, wherein the at least one processor, responsive to executing the instructions, selects a given text character to represent a power on status of a given node of the plurality of nodes and selects an attribute of a given text character of the given text character to represent a characteristic of the given node other than the power on status.

21. The computer system of claim 20, wherein the attribute comprises a color of the given text character, and the feature comprises a temperature associated with the given node.

22. The computer system of claim 18, wherein the at least one processor, responsive to executing the instructions, accesses status data for the nodes in the corresponding chassis units of the cluster, wherein the cluster comprises a plurality of rack-based computer systems, and each rack-based computer system of the plurality of rack-based computer systems comprises chassis units of the plurality of chassis units.

* * * * *